(12) United States Patent
Shimizu et al.

(10) Patent No.: US 7,935,739 B2
(45) Date of Patent: May 3, 2011

(54) CATIONIC CURABLE COMPOSITION AND CURED PRODUCT THEREOF

(75) Inventors: Atsushi Shimizu, Tokyo (JP); Masao Kondo, Tokyo (JP); Kuon Miyazaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 541 days.

(21) Appl. No.: 11/813,297

(22) PCT Filed: Feb. 15, 2006

(86) PCT No.: PCT/JP2006/302610
§ 371 (c)(1),
(2), (4) Date: Jul. 3, 2007

(87) PCT Pub. No.: WO2006/088040
PCT Pub. Date: Sep. 24, 2006

(65) Prior Publication Data
US 2009/0203811 A1 Aug. 13, 2009

(30) Foreign Application Priority Data
Feb. 17, 2005 (JP) .................. 2005-040817

(51) Int. Cl.
*C09J 11/00* (2006.01)
*C09D 11/00* (2006.01)
*C09D 163/00* (2006.01)
*C09D 183/00* (2006.01)
*C08G 59/18* (2006.01)
*C08G 65/02* (2006.01)
*C08L 63/04* (2006.01)
*C08L 83/00* (2006.01)

(52) U.S. Cl. ........ 522/148; 522/167; 522/170; 522/172; 522/181; 522/31; 528/25; 528/87; 528/98; 528/106; 528/219

(58) Field of Classification Search .......... 522/172, 522/181, 148, 167, 170; 528/98, 205, 219, 528/25, 87, 106
See application file for complete search history.

(56) References Cited

U.S. PATENT DOCUMENTS

| | | | | |
|---|---|---|---|---|
| 4,593,051 A | * | 6/1986 | Koleske | 522/2 |
| 5,335,004 A | * | 8/1994 | Matsuhisa | 347/65 |
| 7,569,260 B2 | * | 8/2009 | Miyazaki et al. | 428/1.53 |
| 2006/0222999 A1 | | 10/2006 | Miyazaki et al. | |

FOREIGN PATENT DOCUMENTS

| | | |
|---|---|---|
| JP | 60-186570 | 9/1985 |
| JP | 09-040708 | 2/1997 |
| JP | 09-278813 | 10/1997 |
| JP | 10-087765 | 4/1998 |
| JP | 10-104414 | 4/1998 |
| JP | 10-330463 | 12/1998 |
| JP | 11-349516 | 12/1999 |
| JP | 2000-001648 | 1/2000 |
| JP | 2000-327980 | 11/2000 |
| JP | 2001-348515 | 12/2001 |
| WO | 2005/019299 | 3/2005 |

OTHER PUBLICATIONS

English Language Abstract of JP 3495156, Dec. 21, 1999.
English Language Abstract of JP 09-040708, Feb. 10, 1997.
English Language Abstract of JP 09-278813, Oct. 28, 1997.
English Language Abstract of JP 2000-001648, Jan. 7, 2000.
English Language Abstract of JP 60-186570, Sep. 24, 1985.
English Language Abstract of JP2000-327980, Nov. 28, 2000.
English Language Abstract of JP 10-104414, Apr. 28, 1998.
English Language Abstract of JP 10-087765, Apr. 7, 1998.
English Language Abstract of JP 2001-348515, Dec. 18, 2001.
English Language Abstract of JP 10-330463, Dec. 15, 1998.

* cited by examiner

*Primary Examiner* — Susan W Berman
(74) *Attorney, Agent, or Firm* — Greenblum & Bernstein, P.L.C.

(57) ABSTRACT

An object of the present invention is to provide a cationic curable composition which has low viscosity, can be rapidly photo-cured even in the air, has good adhesion to a substrate such as glass or resin, and is excellent in glass cleaner resistance and water resistance; an ink jet ink, a gravure ink and a hard coating material which comprise the composition; and cured products thereof. A cationic curable composition comprising: (A) 1 to 100 parts by weight of a phenol derivative having 3 or more aromatic rings per molecule, wherein the aromatic ring has a structure in which some or all of hydrogen atoms of phenolic hydroxyl groups of the aromatic ring are substituted by polymerizable functional groups; (B) 1 to 500 parts by weight of a cationic polymerizable compound; and (C) 0.05 to 20 parts by weight of a photo- and/or thermo-cationic initiator is provided.

21 Claims, No Drawings

CATIONIC CURABLE COMPOSITION AND CURED PRODUCT THEREOF

TECHNICAL FIELD

The present invention relates to cationic curable compositions and cured products obtained from the cationic curable compositions. Specifically, the present invention relates to cationic curable compositions which have low viscosity, can provide cured films excellent in glass cleaner resistance, water resistance, adhesion to a substrate after resistance testing and scuff resistance, and are curable by a small amount of light exposure, and to cured products thereof. More specifically, the present invention relates to cationic curable compositions usable in inks and a coating material because the compositions show a reduced increase in viscosity during storage and to cured products thereof. Still more specifically, the present invention relates to cationic curable compositions suitable for use in an ink jet ink, a gravure ink, and a hard coating material and to cured products thereof.

BACKGROUND ART

A curing system using energy rays such as ultraviolet rays has become a dominant method in improving productivity and solving environmental problems of recent years. The main current photo-curing system is a free radical curing system using a (meth)acrylate-based material. However, a material of a cationic curing system using a material such as an epoxy compound, vinyl ether, and oxetane has excellent features compared to the free radical curing system, including that (a) it is excellent in surface and film curability because of being hardly susceptible to cure inhibition by oxygen; (b) it has low cure shrinkage and good adhesion to a wide range of substrates; and (c) the residual monomer amount therein can be reduced to a low level because the life time of active species thereof is long and the curing proceeds slowly even after light irradiation (dark reaction). Thus, the material has recently been examined for the application to coating materials, adhesives, sealing agents for displays, printing inks, stereolithography, silicone-based release papers, photoresists, sealants for electronic components, and the like (see, for example, Non-Patent Document 1). On the other hand, a thermal cationic curing material has a long history and is widely used in applications such as electronic components, coating materials, adhesives, and sealing materials for semiconductors (see, for example, Non-Patent Document 2).

As a material of a photocationic curing system, there is known, for example, a cyclic ether compound such as an epoxy compound, oxetane and a cyclic carbonate or a vinyl ether compound (see, for example, Non-Patent Document 3). In addition, photosensitive compositions comprising a silane compound and a photoacid generator have been proposed for the purpose of improving the abrasion resistance of cured films, and have been attempted to be used in coating materials, inks for ink jet printers, compositions for color filters, and the like (see Patent Documents 1, 2, 3 and 4). However, in each of these attempts, the step of subjecting an alkoxysilane to polycondensation to provide a polyalkoxysilane is provided before the step of obtaining a desired photosensitive composition. Thus, a solvent is positively mixed to obtain the desired photosensitive composition in a state containing the solvent used during the synthesis or to dissolve the polyalkoxysilane. For that reason, the resulting photosensitive composition has a problem with curability. In addition, the composition is insufficient in adhesion to a substrate because the resultant cured film is rigid.

A photosensitive composition has also been proposed in which there are blended a polyfunctional (meth)acrylic ester and a compound in which (meth)acryloyl groups are introduced into a polyorganosilicate (see Patent Document 5). The photosensitive composition has a problem with curability and adhesion to a substrate because it can be free radically cured by the main use of the (meth)acryloyl group. In addition, a non-solvent photosensitive composition containing a non-solvent silane compound has been proposed (see Patent Document 6). In the proposed composition, a cationic reactive compound and a cationic polymerization initiator are blended with a tetraalkoxysilane; an epoxy compound is further blended therein to increase the adhesion thereof to substrates. However, the composition is insufficient in curability and in cleaner resistance and water resistance of a cured film thereof.

Further, for the purpose of improving water resistance, an ultraviolet curing type resin composition has been proposed which comprises a phenol compound, a compound having a carbon-carbon unsaturated bond, and a photoacid generator (see Patent Document 7). However, the proposed ultraviolet curing type resin composition has high viscosity and provides a cured film insufficient in adhesion to a substrate and cleaner resistance. An increased blending amount of the compound having a carbon-carbon unsaturated bond for reducing the viscosity does not result in improved physical properties of the cured film. A photocationic curable composition has also been proposed which uses a vinyl ether compound in which vinyl ether groups are preliminarily introduced into a phenol (see Patent Document 8). According to this proposition, a haloalkyleneoxy vinyl compound represented by general formula (2) below is reacted with a particular phenol novolak resin in the presence of a basic compound to provide a phenol novolak-type vinyl ether compound, in which another vinyl ether compound and a photoacid generator are further blended to offer a cationic curable composition.

$$X\text{---}\{(R_1)_p\text{---}O\text{---}\}_q\text{---}CH\text{=}CH_2 \qquad (2)$$

(wherein X represents a halogen atom; $R_1$ represents a straight-chain or branched alkylene group having a carbon number of 1 to 10; p represents an integer of 1 to 10; and q represents an integer of 0 to 10.)

However, the curable composition is high in viscosity because of using the phenol novolak-type vinyl ether compound. A larger blending amount of the low molecular weight vinyl ether compound for reducing the viscosity results in insufficient adhesion to a substrate.

In addition, Patent Document 9 discloses a curable composition in which a polyfunctional alicyclic epoxy compound, a phenol compound having a particular structure, and a photocationic initiator are mixed together. However, the curable composition disclosed in Patent Document 9 is gradually thickened during storage and therefore is required to be further improved in long-term storage stability.

Patent Document 1: Japanese Patent Laid-Open No. 2000-001648
Patent Document 2: Japanese Patent Laid-Open No. 60-186570
Patent Document 3: Japanese Patent Laid-Open No. 2000-327980
Patent Document 4: Japanese Patent Laid-Open No. 10-104414
Patent Document 5: Japanese Patent Laid-Open No. 10-087765
Patent Document 6: Japanese Patent Laid-Open No. 2001-348515

Patent Document 7: Japanese Patent Laid-Open No. 10-330463

Patent Document 8: Japanese Patent Laid-Open No. 11-349516

Patent Document 9: WO2005/019299

Non-Patent Document 1: Masahiro Kadooka et al., "Kachion Koka Gijutsu No Kogyo Tenkai (Industrial development of a cationic curing technique)", MATERIAL STAGE, vol. 2, No. 2: page 39 to 92, issued by Technical Information Institute Co., Ltd., May 10, 2002

Non-Patent Document 2: Review "Epokishi Jushi (Epoxy resin)" ed. Epokishi Gijutsu Kyokai (society of epoxy techniques), vol. 3 & vol. 4

Non-Patent Document 3: Yasuyuki Tanimoto, "Fotoporima Hyomen Kako Zairyo (A material for processing the surface of photopolymers)", vol. 50: page 51, issued by Bunshin Publishing Co., Ltd.

DISCLOSURE OF THE INVENTION

Problems to be Solved by the Invention

An object of the present invention is to provide cationic curable compositions which have low viscosity, can be rapidly photocured even in the air, have good adhesion to a substrate such as glass and resin, and are excellent in glass cleaner resistance and water resistance; an ink jet ink, a gravure ink and a hard coating material which comprise one of the compositions; and cured products thereof.

Means for Solving the Problems

As a result of intensive studies for solving the above problems, the present inventors have found that the combination of particular raw materials can solve the problems, thereby accomplishing the present invention.

Thus, a first aspect in accordance with the present invention is a cationic curable composition comprising components (A) to (C) in the following proportion:

(A) 100 parts by weight of a phenol derivative having 3 or more aromatic rings per molecule, wherein the aromatic ring has a structure in which some or all of hydrogen atoms of phenolic hydroxyl groups of the aromatic ring are substituted by polymerizable functional groups;

(B) 0.01 to 50,000 parts by weight of a cationic polymerizable compound; and (C) 0.05 to 2,000 parts by weight of a photo- and/or thermo-cationic initiator.

A second aspect in accordance with the present invention is a cationic curable composition comprising components (A) to (C) in the following proportion:

(A) 100 parts by weight of a phenol derivative having 3 or more aromatic rings per molecule, wherein the aromatic ring has a structure in which some or all of hydrogen atoms of phenolic hydroxyl groups of the aromatic ring are substituted by polymerizable functional groups;

(B) 1 to 5,000 parts by weight of a cationic polymerizable compound; and (C) 0.05 to 200 parts by weight of a photo- and/or thermo-cationic initiator.

A third aspect in accordance with the present invention is the cationic curable composition according to any one of the first and second aspects of the invention, wherein the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), is a compound having the aromatic rings in each of which 70 mol % or more of hydrogen atoms of phenolic hydroxyl groups thereof are substituted by polymerizable functional groups.

A fourth aspect in accordance with the present invention is the cationic curable composition according to any one of the first to third aspects of the invention, wherein the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), is a compound having the aromatic rings in each of which substantially all hydrogen atoms of hydroxyl groups of phenolic hydroxyl groups thereof are substituted by polymerizable functional groups.

A fifth aspect in accordance with the present invention is the cationic curable composition according to any one of the first to fourth aspects of the invention, comprising components (A) to (D) in the following proportion:

(A) 1 to 100 parts by weight of the phenol derivative having 3 or more aromatic rings per molecule, wherein the aromatic ring has a structure in which some or all of hydrogen atoms of phenolic hydroxyl groups of the aromatic ring are substituted by polymerizable functional groups;

(B) 1 to 500 parts by weight of the cationic polymerizable compound;

(C) 0.05 to 20 parts by weight of the photo- and/or thermo-cationic initiator; and (D) 100 parts by weight of a reactive organosilicon compound represented by the general formula (1) below:

[Formula 1]

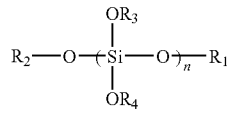

wherein n represents an integer of 1 or more; and $R_1$ to $R_4$ each are an alkyl group having a carbon number of 1 to 4 and may be identical or different.

A sixth aspect in accordance with the present invention is the cationic curable composition according to any one of the first to fifth aspects of the invention, comprising components (A) to (D) in the following proportion:

(A) 1 to 70 parts by weight of the phenol derivative having 3 or more aromatic rings per molecule, wherein the aromatic ring has a structure in which some or all of hydrogen atoms of phenolic hydroxyl groups of the aromatic ring are substituted by polymerizable functional groups;

(B) 50 to 500 parts by weight of the cationic polymerizable compound;

(C) 0.5 to 20 parts by weight of the photo- and/or thermo-cationic initiator; and (D) 100 parts by weight of the reactive organosilicon compound represented by the general formula (1) above.

A seventh aspect in accordance with the present invention is the cationic curable composition according to the sixth aspect of the invention, wherein the reactive organosilicon compound (D) has the general formula (1) wherein n=1.

An eighth aspect in accordance with the present invention is the cationic curable composition according to the first to seventh aspects of the invention, wherein in (A) the phenol derivative having 3 or more aromatic rings per molecule, wherein the aromatic ring has a structure in which some or all of hydrogen atoms of phenolic hydroxyl groups of the aromatic ring are substituted by polymerizable functional groups, the polymerizable functional group is a vinyl ether group and/or —(R—O)$_m$H (wherein R represents an alkyl group optionally having a branched chain; and m represents an integer of 1 to 10).

A ninth aspect in accordance with the present invention is the cationic curable composition according to the first to eighth aspects of the invention, wherein in (A) the phenol derivative having 3 or more aromatic rings per molecule, wherein the aromatic ring has a structure in which some or all of hydrogen atoms of phenolic hydroxyl groups of the aromatic ring are substituted by polymerizable functional groups, the polymerizable functional group is —(R—O)$_m$H (wherein R represents an alkyl group optionally having a branched chain; and m represents an integer of 1 to 10).

A tenth aspect in accordance with the present invention is the cationic curable composition according to the first to ninth aspects of the invention, wherein the cationic polymerizable compound (B) is a vinyl ether compound.

An eleventh aspect in accordance with the present invention is the cationic curable composition according to the first to ninth aspects of the invention, wherein the cationic polymerizable compound (B) is an epoxy compound.

A twelfth aspect in accordance with the present invention is the cationic curable composition according to the eleventh aspect of the invention, wherein the cationic polymerizable compound (B) is an alicyclic epoxy compound.

A thirteenth aspect in accordance with the present invention is the cationic curable composition according to any one of the first to twelfth aspects of the invention, wherein the photo- and/or thermo-cationic initiator (C) is a photocationic initiator.

A fourteenth aspect in accordance with the present invention is a cured product obtained by irradiating the cationic curable composition according to any one of the first to thirteenth aspects of the invention with an actinic ray.

A fifteenth aspect in accordance with the present invention is a cured product obtained by irradiating the cationic curable composition according to any one of the first to thirteenth aspects of the invention with an actinic ray and further heating the irradiated composition.

A sixteenth aspect in accordance with the present invention is a cationic curable ink jet ink using the cationic curable composition according to any one of the first to thirteenth aspects of the invention.

A seventeenth aspect in accordance with the present invention is a cationic curable gravure ink using the cationic curable composition according to any one of the first to thirteenth aspects of the invention.

An eighteenth aspect in accordance with the present invention is a cured product of ink obtained by irradiating the ink according to the sixteenth or seventeenth aspect of the invention with an actinic ray.

A nineteenth aspect in accordance with the present invention is a cured product of ink obtained by irradiating the ink according to the sixteenth or seventeenth aspect of the invention with an actinic ray and further heating the irradiated ink.

A twentieth aspect in accordance with the present invention is a cationic curable composition for hard coating, using the cationic curable composition according to any one of the first to thirteenth aspects of the invention.

A twenty-first aspect in accordance with the present invention is a cationic cured product for hard coating, obtained by irradiating the cationic curable composition for hard coating according to the twentieth aspect of the invention with an actinic ray.

A twenty-second aspect in accordance with the present invention is a cationic cured product for hard coating, obtained by irradiating the cationic curable composition for hard coating according to the twenty-first aspect of the invention with an actinic ray and further heating the irradiated composition.

BEST MODE FOR CARRYING OUT THE INVENTION

The present invention is a cationic curable composition comprising components (A) to (C) in the following proportion:

(A) 100 parts by weight of a phenol derivative having 3 or more aromatic rings per molecule, wherein the aromatic ring has a structure in which some or all of hydrogen atoms of phenolic hydroxyl groups of the aromatic ring are substituted by polymerizable functional groups;

(B) 0.01 to 50,000 parts by weight of a cationic polymerizable compound; and (C) 0.05 to 2,000 parts by weight of a photo- and/or thermo-cationic initiator.

An example of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A) according to the present invention is a compound having 3 or more phenolic aromatic rings per molecule, represented by one of general formulas (3) to (13) to be described, wherein the aromatic ring has some and/or all of the hydrogen atoms of the phenolic hydroxyl groups substituted by polymerizable functional groups.

It is preferable in preventing the thickening of the composition with time during storage that the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), used in the present invention, has a structure in which the phenol compound constituting a raw material for the derivative has 70 mol % or more of the hydrogen atoms of the hydroxyl groups substituted by polymerizable functional groups. The phenol compound constituting the raw material more preferably has substantially all hydrogen atoms of the hydroxyl groups substituted by polymerizable functional groups.

The phenol derivative having 3 or more aromatic rings per molecule, wherein the aromatic ring has a structure in which some or all of hydrogen atoms of phenolic hydroxyl groups of the aromatic ring are substituted by polymerizable functional groups (A) may be a compound having a particular number of phenolic aromatic rings alone or a mixture of compounds having different numbers of phenolic aromatic rings. When the compound having a particular number of phenolic aromatic rings is used alone, a number of 1 to 2 of phenolic aromatic rings makes the compound unsuitable for use because it renders insufficient the glass cleaner resistance and water resistance of a cured product of a resultant cationic curable composition. When the phenol derivative having 3 or more aromatic rings per molecule, wherein the aromatic ring has a structure in which some or all of hydrogen atoms of phenolic hydroxyl groups of the aromatic ring are substituted by polymerizable functional groups (A) is a mixture of compounds having different numbers of phenolic aromatic rings, the content of compounds having 1 to 2 phenolic aromatic rings is preferably 30% by weight or less, more preferably 20% by weight or less, still more preferably 10% by weight or less based on the total of compounds having phenolic aromatic rings. A content of compounds having 1 to 2 phenolic aromatic rings of more than 30% by weight makes insufficient the glass cleaner resistance and water resistance of a cured product of a resultant cationic curable composition.

Thus, the phenol derivative having 3 or more aromatic rings per molecule, constituting the skeleton of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), usable in the cationic curable composition of the present invention, can be synthesized using as a raw material, for example, one of various polynuclear phenol compounds represented by general formulas (3) to (13) below, or a polynuclear phenol compound having 3 or more phenolic aromatic rings which is a Friedel-Crafts adduct between linear polybutadiene and phenol.

[Formula 3]

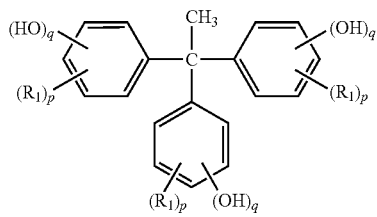

(3)

[Formula 4]

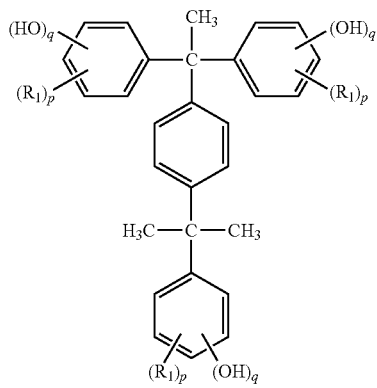

(4)

[Formula 5]

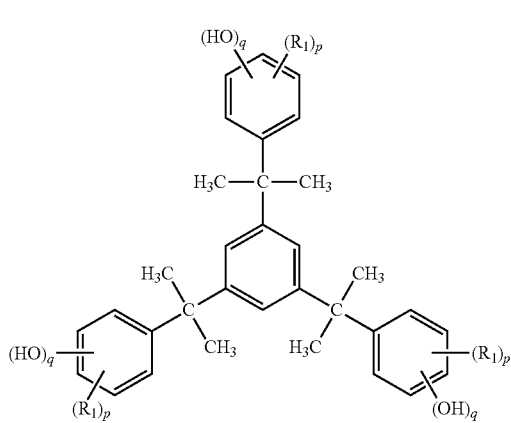

(5)

(in formulas (3) to (5) above, $R_1$ represents alkyl and alkoxy groups having a carbon number of 1 to 5; $R_1$ bonded to the different benzene rings may be identical or different from each other; a number of p of $R_1$ bonded to each ring may be identical or different from each other; p represents an integer of 0 to 4; p bonded to different benzene rings may be identical or different from each other; q represents an integer of 1 to 3; q bonded to different benzene rings may be identical or different from each other; p and q satisfy $p+q \leqq 5$; and wherein $R_1$ is not located at the ortho-position to the hydroxyl group on the benzene ring when $R_1$ has a carbon number of 4 or 5.)

[Formula 6]

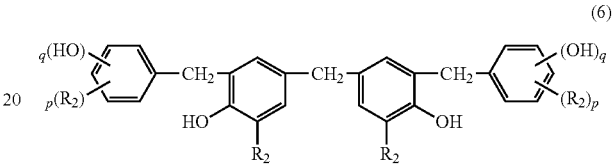

(6)

(wherein $R_2$ is the same as $R_1$ in formula (3) above except that $R_2$ has a carbon number of 1 to 3; and p and q are also the same as those in formula (3).)

[Formula 7]

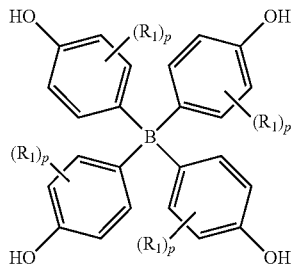

(7)

(wherein B is one group selected from the following formulas (8), (9), and (10):

[Formula 8]

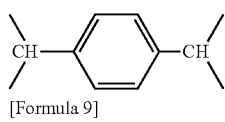

(8)

[Formula 9]

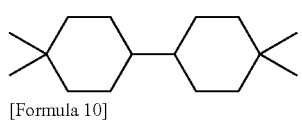

(9)

[Formula 10]

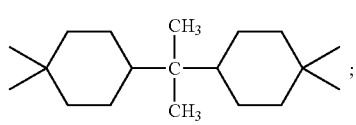

(10)

and $R_1$ and p are the same as those in formula (3).)

[Formula 11]

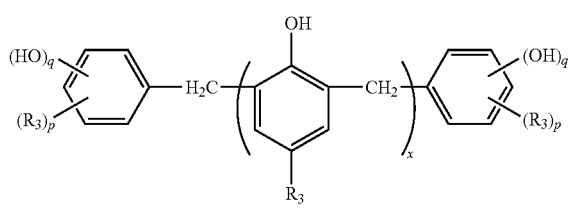

(11)

(wherein $R_3$ is the same as $R_1$ in formula (3); p and q are the same as those in formula (3); x is an integer of 0 or more; and a compound where x=0 (compound (e)) accounts for 30% by weight or less of the total of compounds represented by general formula (II).)

In addition, various polynuclear phenol compounds represented by the following formulas (12) and (13) are enumerated.

[Formula 12]

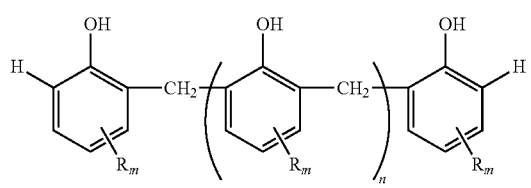

(12)

(wherein $R_m$ represents an alkyl group having a carbon number of 1 to 5, a cycloalkyl group having a carbon number of 5 to 10, an alkoxy group having a carbon number of 1 to 5, a halogen atom, a hydroxyl group, an aryl group, or an aralkyl group; a plurality of $R_m$'s in the formula may be all identical or different from each other; $R_m$ is preferably located at the para-position to the phenolic hydroxyl group; m represents an integer of 0 to 3; n represents an integer of 1 or more; and a compound where n=0 (compound (g)) accounts for 30% by weight or less of the total of compounds represented by general formula (12).)

[Formula 13]

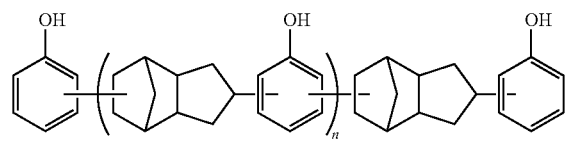

(13)

(wherein n represents an integer of 1 or more; and a compound where n=0 (compound (h)) accounts for 30% by weight or less of the total of compounds represented by general formula (13).)

Among these compounds, a polynuclear phenol compound represented by the above-described general formula (12) is preferable which is excellent in compatibility and reactivity with the cationic polymerizable compound (B) and the reactive organosilicon compound (D). As a commercially available compound, for example, a new narrow molecular weight distribution novolak resin: PAPS (product name, manufactured by Asahi Organic Chemicals Industry Co., Ltd.) is suitably used as a raw material for the polynuclear phenol derivative of the present invention.

The phenol derivative having 3 or more aromatic rings per molecule, wherein the aromatic ring has a structure in which some or all of hydrogen atoms of phenolic hydroxyl groups of the aromatic ring are substituted by polymerizable functional groups (A), used in the present invention is, for example, a compound having aromatic rings of structures in each of which some and/or all hydrogen atoms of phenolic hydroxyl groups of a compound having 3 or more phenolic aromatic rings represented by one of the above general formulas (3) to (13) are substituted by polymerizable functional groups.

The polymerizable functional group used may be any polymerizable functional group provided that it reacts in cationic polymerization. Examples thereof include an epoxy group, a vinyl ether group, an oxetane group, a hydroxyalkyl group, and a polyoxyalkylene group. Among these groups, vinyl ether group, hydroxyalkyl group, and (hydroxy)polyoxyalkylene group are suitable because they are excellent in terms of curability.

Specific examples of the compound include an adduct between a p-alkyl-substituted phenol novolak resin and an alkylene oxide, a hydroxyalkyl vinyl ether, a (poly)alkylene glycol, or a (poly)alkylene glycol divinyl ether. The (poly) alkylene glycol is preferably a compound of formula (14).

$$-(R-O)_m-H \quad (14)$$

(wherein R represents an alkyl group optionally having a branched chain; and m represents an integer of 1 to 10)

The above phenol derivative used in the present invention preferably has substituents in the para-positions to the polymerizable functional groups to reduce coloring during polymerization. The substituent by which the para-position was replaced is not particularly limited; it is preferably an alkyl group, an alkoxy group, a cycloalkyl group, an aryl group, or an aralkyl group, and may have a substituent such as an aromatic ring and halogen on the structure. Specific example of the alkyl group include a methyl group, an ethyl group, a propyl group, an isopropyl group, an n-butyl group, a sec-butyl group, a t-butyl group, a cyclohexyl group, a methoxy group, an ethoxy group, a phenyl group, a naphthyl group, a biphenyl group, a benzyl group, an α-methylbenzyl group, and an α,α'-dimethylbenzyl group.

The phenol derivative having 3 or more aromatic rings per molecule, wherein the aromatic ring has a structure in which some or all of hydrogen atoms of phenolic hydroxyl groups of the aromatic ring are substituted by polymerizable functional groups (A), used in the present invention is synthesized by a known method using the above-described phenol as a raw material. By way of example, the vinyl ether group-substituted phenol compound obtained by preliminarily reacting the vinyl ether group with the phenolic hydroxyl group is easily prepared by reacting the above phenol with a haloalkyleneoxy vinyl compound in the presence of a basic compound. The phenol compound may also be obtained by well mixing a vinyl ether compound with a compound having phenolic aromatic rings and slowly reacting the resultant liquid at 60° C. while stirring.

The hydroxyalkyl group-substituted phenol compound can be synthesized, for example, by adding an alkylene oxide to the above phenols at 80 to 180° C. and ordinary pressure to 10 kg/cm² in the presence of an alkali metal compound such as sodium hydroxide.

Alternatively, the phenol compound can be easily synthesized by mixing a hydroxyalkyl vinyl ether with the above phenols and gently stirring the mixture at 60° C.

The cationic polymerizable compound (B) of the present invention needs only to have a cationic reactive group in one molecule. Specific examples thereof include an epoxy compound, a vinyl ether compound, propenyl ether, an oxetane compound, an oxolane compound, a cyclic acetal compound, a cyclic lactone compound, a thiirane compound, a thiovinyl ether compound, a spiroorthoester compound, an ethylenic unsaturated compound, a cyclic ether compound, and a cyclic thioether compound. These cationic reactive compounds may be used alone or in a combination of two or more thereof.

Among these cationic reactive compounds, preferred are a vinyl ether compound and an epoxy compound. Examples of the vinyl ether compound include ethylene glycol divinyl ether, butanediol divinyl ether, cyclohexane dimethanol divinyl ether, cyclohexanediol divinyl ether, trimethylolpropane trivinyl ether, pentaerythritol tetravinyl ether, glycerol trivinyl ether, triethylene glycol divinyl ether, diethylene glycol divinyl ether, dipropylene glycol divinyl ether, tripropylene glycol divinyl ether, hydroxyethyl vinyl ether, hydroxybutyl vinyl ether, cyclohexanedimethanol monovinyl ether, cyclohexanediol monovinyl ether, 9-hydroxynonyl vinyl ether, propylene glycol monovinyl ether, neopentylglycol monovinyl ether, glycerol divinyl ether, glycerol monovinyl ether, trimethylolpropane divinyl ether, trimethylolpropane monovinyl ether, pentaerythritol monovinyl ether, pentaerythritol divinyl ether, pentaerythritol trivinyl ether, diethylene glycol monovinyl ether, triethylene glycol monovinyl ether, tetraethylene glycol monovinyl ether, tricyclodecanediol monovinyl ether, and tricyclodecanedimethanol monovinyl ether.

Examples of the epoxy compound include a glycidyl ether-type epoxy compound and an alicyclic epoxy compound.

Specific examples of the glycidyl ether-type epoxy compound include a bisphenol A-type epoxy compound, a bisphenol F-type epoxy compound, a phenol novolak-type epoxy compound, a cresol novolak-type epoxy compound, a hydrogenated bisphenol A-type epoxy compound, a diglycidyl ether of an alkylene oxide adduct of bisphenol A, a diglycidyl ether of an alkylene oxide adduct of bisphenol F, a diglycidyl ether of an alkylene oxide adduct of hydrogenated bisphenol A, ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polyethylene glycol diglycidyl ether, polypropylene glycol diglycidyl ether, trimethylolpropane di- and/or tri-glycidyl ether, pentaerythritol tri- and/or tetra-glycidyl ether, sorbitol hepta- and/or hexa-glycidyl ether, resorcin diglycidyl ether, a dicyclopentadiene-phenol addition type glycidyl ether, methylenebis(2,7-dihydroxynaphthalene)tetraglycidyl ether, and 1,6-dihydroxynaphthalene diglycidyl ether.

Specific examples of the alicyclic epoxy compound include 3,4-epoxycyclohexylmethyl-3,4-epoxycyclohexanecarboxylate, 2-(3,4-epoxycyclohexyl-5,5-spiro-3,4-epoxy)cyclohexane-meta-dioxane, bis(3,4-epoxycyclohexylmethyl) adipate, vinylcyclohexene dioxide, 4-vinylepoxycyclohexane, bis(3,4-epoxy-6-methylcyclohexylmethyl) adipate, 3,4-epoxy-6-methylcyclohexyl-3,4-epoxy-6-methylcyclohexanecarboxylate, methylene bis(3,4-epoxycyclohexane), dicyclopentadiene diepoxide, ethylene glycol di(3,4-epoxycyclohexylmethyl)ether, ethylene bis(3,4-epoxycyclohexanecarboxylate), propylenebis(3,4-epoxycyclohexanecarboxylate), dioctyl epoxyhexahydrophthalate, di-2-ethylhexyl epoxyhexahydrophthalate, and 1,4-cyclohexanedimethanol di(3,4-epoxycyclohexanecarboxylate). As an epoxy compound blended in the composition of the present invention, a bi-or-more-functional alicyclic epoxy compound is suitably used because it is excellent in terms of reactivity.

The photo- and/or thermo-cationic initiator (C) used in the present invention is a compound capable of generating a substance initiating cationic polymerization upon irradiation with energy rays such as light and heat; particularly preferred is an onium salt which generates a Lewis acid upon energy ray irradiation.

Examples of the photocationic initiator specifically include a diazonium salt of a Lewis acid, an iodonium salt of a Lewis acid, and a sulfonium salt of a Lewis acid. These photocationic initiators are onium salts in which the cation portions are an aromatic diazonium, an aromatic iodonium, and an aromatic sulfonium, respectively and the anion portions are composed of $BF_4^-$, $PF_6^-$, $SbF_6^-$, $[BX_4]^-$ (wherein X represents a phenyl group substituted by at least two fluorine or trifluoromethyl groups.), and the like.

Specific examples thereof include a phenyldiazonium salt of boron tetrafluoride, a diphenyliodonium salt of phosphorus hexafluoride, a diphenyliodonium salt of antimony hexafluoride, a tri-4-methylphenylsulfonium salt of arsenic hexafluoride, a tri-4-methylphenylsulfonium salt of antimony tetrafluoride, a diphenyliodonium salt of tetrakis(pentafluorophenyl)boron, a mixture of acetylacetone aluminium salt and orthonitrobenzyl silyl ether, a phenylthiopyridium salt, and a phosphorus hexafluoride allene-iron complex. As commercial products thereof, there may be used, for example, CD-1012 (trade name, manufactured by Sartomer Company Inc.), PCI-019 and PCI-021 (trade names, manufactured by Nippon Kayaku Co., Ltd.), Optomer-SP-150 and Optomer-SP-170 (trade names, manufactured by Asahi Denka Co., Ltd.), UVI-6990 (trade name, manufactured by The Dow Chemical Company), CPI-100P and CPI-100A (trade names, manufactured by SAN-APRO Ltd.), TEPBI-S (trade name, manufactured by Nippon Shokubai Co., Ltd.), and R HODORSIL PHOTOINITIATOR2074 (trade name, manufactured by Rhodia Inc.). These photocationic initiators may be used alone or in a combination of two or more thereof, and may be each also used in combination with one or more thermo-cationic initiators.

Among these photocationic initiators, an onium salt in which the anion portion is $PF_6^-$ is preferable; a sulfonium salt in which the anion portion is $PF_6^-$ is more preferably used because it is excellent in terms of stability, curing properties, and safety.

Specific examples of the thermo-cationic initiator which may be used include the commercial products Adekaopton CP-66 and CP-77 (trade names, manufactured by Asahi Denka Co., Ltd.), San-Aid SI-60L, SI-80L, SI-100L, SI-110L and SI-180L (trade names, manufactured by Sanshin Chemical Industry Co., Ltd.), CI-2920, CI-2921, CI-2946, CI-2639, CI-2624 and CI-2064 (trade names, manufactured by Nippon Soda Co., Ltd.), and FC-520 (trade name, manufactured by 3M Company). These thermo-cationic initiators may be used alone or in a combination of two or more thereof, and may be each also used in combination with one or more photocationic initiators.

The composition of the present invention further comprises a reactive organosilicon compound (D) represented by general formula (1) below to improve glass cleaner resistance and water resistance.

[Formula 13]

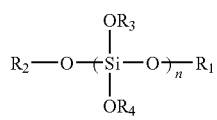

(wherein n represents an integer of 1 or more; and $R_1$ to $R_4$ each represent an alkyl group having a carbon number of 1 to 4 and may be identical or different from each other.)

The reactive organosilicon compound (D) of the present invention is not particularly limited provided that it is a compound meeting the requirements of the above general formula (1); however, among compounds represented by the general formula (1), a compound in which n is 2 or less is preferable; more specifically, a compound in which n=1 preferably accounts for 50% by weight or more, more preferably 80% by weight or more of the total compounds. The mean of n is preferably 1.5 or less; more preferred is n=1. The alkyl group of a compound represented by the general formula (1) preferably has a carbon number of 1 to 4, more preferably 1 or 2; most preferred is 2 in terms of reactivity and safety.

Examples of the reactive organosilicon compound can include a tetraalkoxysilane such as tetramethoxysilane, tetraethoxysilane, tetrapropoxysilane, and tetrabutoxysilane, and a polycondensate of each of these alkoxysilanes alone or of a mixture of 2 or more thereof; preferred is a polycondensate of tetraethoxysilane and/or tetraethoxysilane because they are excellent in terms of photo-curability.

The cationic curable composition of the present invention may further optionally contain a free-radically polymerizable compound such as a (meth)acrylate monomers or oligomers, and vinyl (meth)acrylate, a radical initiator, an antifoaming agent, a leveling agent, a polymerization inhibitor, a wax, an antioxidant, a nonreactive polymer, a particulate inorganic filler, a silane coupling agent, a photostabilizer, an ultraviolet absorber, an antistatic agent, a slipping agent, and other additives.

In the cationic curable composition of the present invention, a different polymerization initiator may also be used in combination with the photo- and/or thermo-cationic initiator (C) of the present invention. Specific examples of the different polymerization initiator include 4,4'-bis(diethylamino) benzophenone, 2,4-diethylthioxanthone, isopropylthioxanthone, 9,10-diethoxyanthracene, and 9,10-dibutoxyanthracene.

In addition to the above compounds, it is possible to add other compounds having cationic polymerizability to the extent they do not adversely affect curability and film properties at the time of curing. Examples of other compounds include a low molecular weight epoxy compound other than the above, which can be used as a diluent; a cyclic lactone compound; a cyclic acetal compound; a cyclic thioether compound; and a spiroorthoester compound. There may also be used diol such as ethylene glycol, propylene glycol, polyethylene glycol (e.g., diethylene glycol, triethylene glycol), and polypropylene glycol and a polyfunctional alcohol such as glycerin, trimethylolpropane, and pentaerythritol which have conventionally been employed.

The actinic ray necessary for curing the cationic curable composition in the present invention is not particularly limited provided that it can cure the composition within a predetermined time. Examples of a means for irradiating the cationic curable composition with the actinic ray include an extra-high pressure mercury lamp, a high pressure mercury lamp, a low pressure mercury lamp, a metal halide lamp, a xenon lamp, a pulsed xenon lamp, and an electrodeless discharge lamp.

The cationic curable composition of the present invention can be heated after having been irradiated with the actinic ray to further enhance the conversion rate thereof. Specifically, the curing of the composition is promoted by the heat treatment thereof on a hot plate or in a convection oven at a predetermined temperature of 100 to 180° C., preferably 130 to 170° C. for a predetermined time of about 1 to 30 minutes.

The composition proportion of each component in the cationic curable composition used in the present invention will now be described. In this respect, the term "parts" described below stands for "parts by weight".

The proportion of the cationic polymerizable compound (B) is 0.01 to 50,000 parts by weight, preferably 1 to 50,000 parts by weight, more preferably 1 to 5,000 parts by weight based on 100 parts by weight of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A).

The proportion of the photo- and/or thermo-cationic initiator (C) is 0.05 to 2,000 parts by weight, preferably 0.1 to 1,000 parts by weight, more preferably 0.5 to 200 parts by weight.

The proportion of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), blended in the cationic curable composition is preferably 1 to 100 parts by weight, more preferably 1 to 70 parts by weight, still more preferably 1 to 50 parts by weight based on 100 parts by weight of the reactive organosilicon compound (D). One part by weight or more of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A) makes high curability, adhesion to a substrate and glass cleaner resistance. The phenol derivative in an amount of 100 parts by weight or less suppresses an increase in the viscosity of the composition and makes favorable the curability, glass cleaner resistance and water resistance of a cured film.

The proportion of the cationic polymerizable compound (B) blended in the present invention is preferably 1 to 500 parts by weight, more preferably 5 to 200 parts by weight, still more preferably 10 to 100 parts by weight based on 100 parts by weight of the reactive organosilicon compound (D). Addition of 500 parts by weight or less of the cationic polymerizable compound (B) makes excellent the glass cleaner resistance and water resistance.

The content of the photo- and/or thermo-cationic initiator (C) in the cationic curable composition of the present invention is preferably 0.05 to 20 parts by weight, more preferably 0.5 to 20 parts by weight, still more preferably 1 to 10 parts by weight based on 100 parts by weight of the reactive organosilicon compound (D). An amount of 0.05 parts by weight or more of the photo- and/or thermo-cationic initiator (C) makes high the photo-curability of the composition; 20 parts by weight or less leads to the sufficient curing of even the inside of the film and makes excellent the glass cleaner resistance and water resistance the film.

When expressed as weight percentage, the preferable composition range of the present invention is 0.5 to 20% by weight of the phenol derivative having 3 or more aromatic rings per molecule, wherein the aromatic ring has a structure in which some or all of hydrogen atoms of phenolic hydroxyl groups of the aromatic ring are substituted by polymerizable functional groups (A), 25 to 80% by weight of the cationic polymerizable compound (E), 0.5 to 5% by weight of the photo- and/or thermo-cationic initiator (C), and 15 to 35% by weight of the reactive organosilicon compound (D).

The cationic curable composition of the present invention may also optionally contain a free-radically polymerizable compound such as a (meth)acrylate monomer, an oligomer, and vinyl (meth)acrylate, a photo-radical initiator, an antifoaming agent, a leveling agent, a polymerization inhibitor, a wax, an antioxidant, a nonreactive polymer, a particulate inorganic filler, a silane coupling agent, a photostabilizer, an ultraviolet absorber, an antistatic agent, a slipping agent, and other additives. The blending amount of these additives is 0.01 to 10 parts by weight, preferably 0.1 to 5 parts by weight based on 100 parts by weight of the reactive organosilicon compound (D).

A coloring agent can be added to the composition of the present invention to make an ink jet ink or a gravure ink. In the ink jet printing method, it is an essential requirement that the ink has low viscosity in view of the discharge stability of ink. The gravure ink is also desired to have high-speed curability and high adhesion in view of high-speed printing and printing on a plastic film. The cationic curable composition of the present invention has low viscosity, which, in combination with excellent curability and adhesion to a substrate, enables the suitable use thereof also as a photosensitive ink jet ink or gravure ink by mixing with an appropriate coloring agent.

Among the coloring agents which may be used in the present invention are various organic and/or inorganic pigments. Specific examples thereof include white pigments such as titanium oxide, zinc oxide, white lead, lithopone and antimony oxide; black pigments such as aniline black, iron black and carbon black; yellow pigments such as chrome yellow, yellow iron oxide, hansa yellow (100, 50, 30, etc.), titan yellow, benzine yellow and permanent yellow; orange pigments such as chrome vermilion, permanent orange, vulcan first orange and indanthrene brilliant orange; brown pigments such as iron oxide, permanent brown and para-brown; red pigments such as red oxide, cadmium red, antimony vermilion, permanent red, rhodamine lake, alizarin lake, thioindigo red, PV carmine, monolight first red and quinacridone-based red pigments; violet pigments such as cobalt violet, manganese violet, first violet, methyl violet lake, indanthrene brilliant violet and dioxazine violet; blue pigments such as ultramarine blue, iron blue, cobalt blue, alkali blue lake, nonmetal phthalocyanine blue, copper phthalocyanine blue, indanthrene blue and indigo; green pigments such as chrome green, chronic oxide, emerald green, naphthol green, green gold, acid green lake, malachite green lake, phthalocyanine green and polychloro-bromo copper phthalocyanine; and various fluorescent pigments, metallic powder pigments, and extender pigments. The content of these pigments in the composition of the present invention is 1 to 50% by weight, preferably 5 to 25% by weight.

Pigment dispersants may optionally be used for the above pigments. Examples of the pigment dispersant which may be used in the present invention include active agents such as higher fatty acid salts, alkyl sulfates, alkyl ester sulfates, alkyl sulfonates, sulfosuccinates, naphthalene sulfonates, alkyl phosphates, polyoxyalkylene alkyl ether phosphates, polyoxyalkylene alkyl phenyl ethers, glycerol esters, sorbitan esters and polyoxyethylene fatty acid amides; and block copolymers and random copolymers comprising two or more monomers selected from the group consisting of styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives, and salts thereof.

For a method of dispersing pigments, any of various dispersing machines may be used such as, for example, a ball mill, a sand mill, an attritor, a roll mill, an agitator, a Henschel mixer, a colloid mill, a ultrasonic homogenizer, a pearl mill, a wet jet mill, and a paint shaker. A centrifuge or a filter may also be used to remove coarse particles in the pigment dispersion.

The average size of pigment particles in the pigment ink is selected in consideration of stability in the ink, image density, feeling of gloss, light resistance, and the like; preferably, the particle size is properly selected also in view of the improvement of gloss and texture.

The cationic curable composition of the present invention enables a film thereof to be cured at high speed in the air and therefore can suitably be used also as a hard coating material on a resin film, a substrate, or the like, which is required to be cured at high speed without heating. Examples of the above include a coating material for forming an antireflective film, used in FPD and the like, which is obtained by adding porous particulates having voids to the cationic curable composition of the present invention in order to form a film having a refractive index of 1.4 or less when the composition is applied on a substrate and cured.

These porous particulates include silica particles having an average particle size of 5 nm to 1 µm; particularly preferred are silica particles having an average particle size of 5 to 100 nm. Specific examples thereof include Aerosil (manufactured by Japan Aerosil Co., Ltd.), a fumed silica which is hydrophilic or surface treated for hydrophobization, and Snowtex PS (manufactured by Nissan Chemical Industries, Ltd.), a pearl necklace-form silica sol in which silica particles are connected in a straight chain form.

These porous particulates are used by adding to the cationic curable composition in the range of 10 to 70 parts by weight based on 100 parts by weight of the composition; they are preferably uniformly dispersed in the composition using a homogenizer or the like. The coating material composition may optionally be used in combination with a silane coupling agent which is an alkoxysilane to which an organic group is bonded.

The coating agent thus obtained is applied on a transparent substrate, for example, a resin substrate such as polymethyl methacrylate, polycarbonate, polystyrene, and triacetylcellulose, or an inorganic material such as glass to form an antireflective film having a thickness ranging from 10 nm to 1 µm. In applying the agent to the substrate, a coating method is used such as micro-gravure, roll coating, flow coating, spin coating, die coating, cast transfer, and spray coating because it is necessary to form a relatively thin film with a high degree of precision.

When the composition of the present invention is used, it is a key feature to be able to cure the applied thin film at high speed by irradiating with the above-described actinic ray, but the irradiation may optionally be combined with heating for curing. Specifically, the composition of the present invention essentially contains no solvent or the like, but the composition may contain a solvent when it is diluted in order to adjust the viscosity thereof or when the porous particulates are used in the form of a sol. In these cases, the composition may typically be heated at 50 to 150° C. for on the order of several minutes to volatilize the solvent component in advance. It is also possible to heat the exposed composition in the same manner to further promote the curing.

EXAMPLES

The present invention will be more specifically described based on Examples and the like. However, the invention is not intended to be limited to these Examples and the like in any manner. The term "parts" in Examples and Comparative Examples means parts by weight.

In addition, the photo-curability of a photosensitive composition and the physical properties of a cured film thereof were evaluated by the following methods.

<Apparatus and Method for Forming a Coating Film>

Photoirradiation apparatus: 400 W High-pressure mercury-vapor lamp (manufactured by Sen Lights Corporation)

Coating: Bar coater for 12 μm-thick coating (manufactured by K-Bar)

<Phenol Compound>

In Examples of the present invention, a p-tert-Bt-phenol novolak resin (manufactured by Asahi Organic Chemicals Industry Co., Ltd.) was used which has a residual monomer content of less than 1% by weight and a dinuclear phenol content of 16 wt %. The resin is simply referred to as p-tert-Bt-phenol novolak resin in the following Examples.

<Evaluation of Photo-Curability and Physical Properties of a Cured Film>

Tack-free exposure dose (TFED): An exposed film was observed by touching it to determine the minimum exposure dose necessary for curing the surface and eliminating stickiness therefrom.

Viscosity: The resultant cationic curable composition was measured using the E-type rotational viscometer TVE-20H (manufactured by Toki Sangyo Co., Ltd.) under conditions of 25° C. and 100 rpm.

Storage stability: A composition showing a viscosity increase of 10% or less after one-week storage at 50° C. was determined to have good storage stability.

Adhesion to substrate: The cationic curable composition was coated on a PMMA substrate into a thickness of 12 μm using a bar coater and cured at TFED. The cured film was subjected to a cross cut tape peel (cross cut) test. When no peeling was observed in the cross cut portion, the adhesion of the film was determined to be "good"; when peeling, even if only slightly, occurred, the adhesion thereof, to be "poor".

Glass cleaner resistance: The cationic curable composition was coated to a glass substrate and cured at an exposure dose of 240 mJ/cm$^2$. Subsequently, a glass cleaner was coated to the cured film, allowed to stand at room temperature for 10 minutes, and then wiped off, followed by visually observing the surface state of the film. Here, when no surface roughness, crack or whitening was observed, the glass cleaner resistance of the film was determined to be "good"; when whitening or crack occurred, the resistance thereof, to be "poor". Then, the cured film subjected to the glass cleaner resistance test was further evaluated for adhesion by the cross cut tape peel (cross cut) test. When no peeling was observed in the cross cut portion, the adhesion of the film was determined to be "good"; when peeling, even if only slightly, occurred, the adhesion thereof, to be "poor".

Water resistance: The cationic curable composition was coated to a glass substrate and cured at an exposure dose of 240 mJ/cm$^2$. The surface of the cured film was then rubbed 60 times with Kimwipe (an industrial wiper manufactured by Crecia Corporation) soaked with water, followed by visually observing the surface state. Here, when no surface roughness was observed, the water resistance of the film was determined to be "good"; when whitening or crack occurred, the water resistance thereof, to be "poor". Then, the cured film subjected to the water resistance test was further evaluated for adhesion by the cross cut tape peel (cross cut) test. When no peeling was observed in the cross cut portion, the adhesion of the film was determined to be "good"; when peeling, even if only slightly, occurred, the adhesion thereof, to be "poor".

Transparency: The cationic curable composition was coated to a glass substrate and cured at TFED, followed by visually determining the transparency of the cured film. When the film was transparent, the transparency of the film was determined to be "good"; when the film was transparent but had wrinkles or slightly colored, the transparency thereof, to be "fair"; and when the film was whitened or obviously colored, to be "poor".

Example 1

A cationic curable composition was obtained by well mixing 96 parts by weight of triethylene glycol divinyl ether (manufactured by Nippon Carbide Industries Co., Inc.) as a compound containing vinyl ether groups, 5 parts by weight of a compound in which ethylene oxide was added to all hydroxyl groups of p-tert-Bt-phenol novolak resin (manufactured by Asahi Organic Chemicals Industry Co., Ltd.) as a nuclear phenol, and 4 parts by weight of CPI100P (containing about 50% by weight propylene carbonate, manufactured by SAN-APRO Ltd.) as a sulfonium salt-type photocationic initiator. The composition was coated on a glass substrate into a film thickness of 12 μm using a bar coater and exposed using a 400 W high-pressure mercury lamp exposure machine (manufactured by Sen Lights Corporation), followed by evaluating the photo-curability of the coated film and the physical properties of the cured film. The results are shown in Table 1.

Example 2

In a 100-ml eggplant-shaped flask were placed 50 parts of hydroxybutyl vinyl ether (manufactured by Maruzen Petrochemical Co., Ltd.) as a cationic curable compound and 25 parts by weight of p-tert-Bt-phenol novolak resin (manufactured by Asahi Organic Chemicals Industry Co., Ltd.) as a polynuclear phenol, which were then reacted slowly at 60° C. to provide a vinyl ether-functionalized phenol solution. When the reaction was checked for the resultant solution by a high performance liquid chromatograph: L-7000 series (manufactured by Hitachi Ltd.), all peaks derived from the p-tert-Bt-phenol novolak resin were found to have disappeared. Thus, hydroxybutyl vinyl ether was probably added to all hydrogen atoms of the phenolic hydroxyl groups of the p-tert-Bt-phenol novolak resin. In 50 parts of the solution (a mixture of 28.4 parts by weight of a hydroxybutyl vinyl ether adduct of p-tert-Bt-phenol novolak resin and 21.6 parts by weight of hydroxybutyl vinyl ether) was well mixed 4 parts by weight of UVI6992 (containing about 50% by weight propylene carbonate, manufactured by Dow Chemical Japan Ltd.) as a sulfonium salt-type photocationic initiator to provide a cationic curable composition. The resultant cationic curable composition was evaluated for the photocurability of the coated film and the physical properties of the cured film as described in Example 1. The results are shown in Table 1.

Example 3

To the composition in Example 1 was further added 100 parts of tetraethoxysilane (TSL8124 manufactured by GE Toshiba Silicones Co., Ltd.) as a reactive organosilicon compound to provide a cationic curable composition. The resultant cationic curable composition was evaluated for the photocurability of the coated film and the physical properties of the cured film as described in Example 1. The results are shown in Table 1.

Example 4

In a 100-ml eggplant-shaped flask were placed 50 parts by weight of triethylene glycol divinyl ether (manufactured by Nippon Carbide Industries Co., Inc.) as a cationic curable compound and 25 parts by weight of p-tert-Bt-phenol novolak resin (manufactured by Asahi Organic Chemicals Industry Co., Ltd.) as a polynuclear phenol, which were then reacted slowly at 60° C. to provide a vinyl ether-functionalized phenol solution. When the reaction was checked for the resultant solution by the high performance liquid chromatography: L-7000 series (manufactured by Hitachi Ltd.), all peaks derived from the p-tert-Bt-phenol novolak resin were found to have disappeared. Further, when its infrared absorption spectrum was obtained and analyzed using the Fourier transform infrared spectrophotometer FT/IR-460 plus (manufactured by JASCO Corporation), the absorption around 3,400 $cm^{-1}$ due to the hydroxyl group was found to have disappeared. Thus, triethylene glycol divinyl ether was probably added to all hydrogen atoms of the phenolic hydroxyl groups of the p-tert-Bt-phenol novolak resin. In 50 parts of the solution (a mixture of 37.2 parts by weight of a triethylene glycol divinyl ether adduct of p-tert-Bt-phenol novolak resin and 12.8 parts by weight of triethylene glycol divinyl ether) were well mixed 50 parts by weight of tetraethoxysilane (TSL8124 manufactured by GE Toshiba Silicones Co., Ltd.) as a reactive organosilicon compound and 4 parts by weight of UVI6992 (containing about 50% by weight propylene carbonate, manufactured by Dow Chemical Japan Ltd.) as a sulfonium salt-type photocationic initiator to provide a cationic curable composition. The composition was coated on a glass substrate into a film thickness of 12 μm using a bar coater and then exposed using a 400 W high-pressure mercury lamp exposure machine (manufactured by Sen Lights Corporation), followed by evaluating the photo-curability of the coated film and the physical properties of the cured film. The results are shown in Table 1.

Example 5

In place of the tetraethoxysilane used in Example 4, 50 parts by weight of Wacker Silicate TES40 (manufactured by Wacker Asahikasei Silicone Co., Ltd.), a partial condensate of tetraethoxysilane, was employed to prepare a cationic curable composition, followed by evaluating the performance of a cured film thereof. The results are shown in Table 1.

Example 6

In place of the triethylene glycol divinyl ether used in Example 4, 50 parts by weight of trimethylolpropane divinyl ether (manufactured by Maruzen Petrochemical Co., Ltd.) was used to prepare a cationic curable composition. It is likely that the composition of the resultant cationic curable composition is 35.5 parts by weight of a trimethylolpropane divinyl ether adduct of p-tert-Bt-phenol novolak, 14.5 parts by weight of trimethylolpropane divinyl ether, 50 parts by weight of tetraethoxysilane, and 4 parts by weight of UVI6992. The cationic curable composition was evaluated for the performance of a cured film thereof. The results are shown in Table 1.

Example 7

In the cationic curable composition in Example 4 was further used 25 parts by weight of UVR6105 (trade name, manufactured by Dow Chemical Japan Ltd.), an alicyclic epoxy compound, to prepare a cationic curable composition, followed by evaluating the performance of a cured film thereof. The results are shown in Table 1.

Example 8

In the cationic curable composition in Example 6, 30 parts by weight of hydroxybutyl vinyl ether (manufactured by Maruzen Petrochemical Co., Ltd.) was used in place of trimethylolpropane divinyl ether to prepare a cationic curable composition. It is likely that the composition of the resultant cationic curable composition is 38.8 parts by weight of a hydroxybutyl vinyl ether adduct of p-tert-Bt-phenol novolak, 11.2 parts by weight of hydroxybutyl vinyl ether, 50 parts by weight of tetraethoxysilane, and 4 parts by weight of UVI6992. The cationic curable composition was evaluated for the performance of a cured film thereof. The results are shown in Table 1.

Example 9

A cationic curable composition was prepared as described in Example 1, except for use of a phenol novolak resin (residual monomer content: less than 1% by weight, dinuclear phenol content: 16% by weight; manufactured by Asahi Organic Chemicals Industry Co., Ltd.) as a polynuclear phenol having no substituents in the para-positions, followed by evaluating the performance of a cured film thereof. The results are shown in Table 1.

Comparative Example 1

In a method similar to that in Example 1, 5 parts by weight of a compound in which ethylene oxide was added to all hydroxyl groups of p-tert-Bt-phenol (manufactured by Dainippon Ink And Chemicals, Inc.) was used in place of the compound in which ethylene oxide was added to all hydroxyl groups of p-tert-Bt-phenol novolak resin to prepare a cationic curable composition, followed by evaluating the performance of a cured film thereof. The results are shown in Table

Comparative Example 2

In a method similar to that in Example 1, 5 parts by weight of 2-2'-methylenebis[4-methylphenol] (manufactured by Honshu Chemical Industry Co., Ltd.) was used in place of the compound in which ethylene oxide was added to all hydroxyl groups of p-tert-Bt-phenol novolak resin to prepare a cationic curable composition, followed by evaluating the performance of a cured film thereof. The results are shown in Table 1.

Comparative Example 3

In a method similar to that in Example 3, 5 parts by weight of 2-2'-methylenebis[4-methylphenol] (manufactured by Honshu Chemical Industry Co., Ltd.) was used in place of the compound in which ethylene oxide was added to all hydroxyl groups of p-tert-Bt-phenol novolak resin to prepare a cationic curable composition, followed by evaluating the performance of a cured film thereof. The results are shown in Table 1.

Comparative Example 4

In a method similar to that in Example 3, 5 parts by weight of p-tert-Bt-phenol (manufactured by Dainippon Ink And Chemicals, Inc.) was used in place of the compound in which ethylene oxide was added to all hydroxyl groups of p-tert-Bt-phenol novolak resin to prepare a cationic curable composition, followed by evaluating the performance of a cured film thereof. The results are shown in Table 1.

Comparative Example 5

A cationic curable composition was prepared by well mixing 50 parts by weight of triethylene glycol divinyl ether (manufactured by Nippon Carbide Industries Co., Inc.) as a cationic polymerizable compound, 5 parts by weight of the phenol novolak resin (manufactured by Asahi Organic Chemicals Industry Co., Ltd.) used in Example 9 as a polynuclear phenol, and 2 parts by weight of UVI6992 (containing about 50% by weight propylene carbonate, manufactured by Dow Chemical Japan Ltd.) as a sulfonium salt-type photocationic initiator, followed by evaluating the performance of a cured film thereof. The results are shown in Table 1.

Comparative Example 6

In a 100-ml eggplant-shaped flask were placed 50 parts by weight of triethylene glycol divinyl ether (manufactured by Nippon Carbide Industries Co., Inc.) as a cationic polymerizable compound and 25 parts by weight of 2-2'-methylenebis [4-methylphenol] (manufactured by Honshu Chemical Industry Co., Ltd.), which was then reacted slowly at 60° C. to provide a vinyl ether-functionalized phenol solution. In 50 parts by weight of the resultant solution was well mixed 2 parts by weight of UVI6992 (containing about 50% by weight propylene carbonate, manufactured by Dow Chemical Japan Ltd.) as a photocationic initiator to prepare a cationic curable composition. It is likely that the composition of the resultant cationic curable composition is 46.3 parts by weight of a triethylene glycol divinyl ether adduct of 2-2'-methylenebis [4-methylphenol], 3.7 parts by weight of triethylene glycol divinyl ether, and 2 parts by weight of UVI6992. The cationic curable composition was evaluated for the performance of a cured film thereof. The results are shown in Table 1.

Comparative Example 7

A cationic curable composition was prepared by well mixing 50 parts by weight of triethylene glycol divinyl ether (manufactured by Nippon Carbide Industries Co., Inc.) as a cationic polymerizable compound and 2 parts by weight of UVI6992 (containing about 50% by weight propylene carbonate, manufactured by Dow Chemical Japan Ltd.) as a photocationic initiator, followed by evaluating the performance of a cured film thereof. The results are shown in Table 1.

INDUSTRIAL APPLICABILITY

The cationic curable composition of the present invention has low viscosity, can provide a cured film excellent in glass cleaner resistance, water resistance, adhesion to substrates after resistance testing and scuff resistance, and is curable by a small amount of light exposure. Thus, the composition can be suitably used in inks and coatings, for example, an ink jet ink, a gravure ink, and a hard coating material.

The invention claimed is:

1. A cationic curable composition, comprising components (A) to (D) in the following proportion:
    (A) 1 to 100 parts by weight of a phenol derivative having 3 or more aromatic rings per molecule, wherein the phenol derivative has a structure in which some or all hydrogen atoms of phenolic hydroxyl groups of the aromatic rings are substituted by polymerizable functional groups, and in which some or all of the positions para to the phenolic hydroxyl groups include substituents;
    (B) 1 to 500 parts by weight of a cationic polymerizable compound;
    (C) 0.05 to 20 parts by weight of a photo- and/or thermo-cationic initiator; and
    (D) 100 parts by weight of a reactive organosilicon compound represented by the formula (I):

[Formula 1]

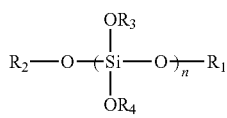

(1)

wherein n represents an integer of 1 or 2; and $R_1$ to $R_4$ each are an alkyl group having a carbon number of 1 to 4 and may be identical or different.

2. The cationic curable composition according to claim 1, comprising components (A) to (D) in the following proportion:
    (A) 1 to 100 parts by weight of a phenol derivative having 3 or more aromatic rings per molecule, wherein the phenol derivative has a structure in which some or all hydrogen atoms of phenolic hydroxyl groups of the aromatic rings are substituted by polymerizable functional

TABLE 1

|  | TFED | Viscosity | Adhesion to substrate | Transparency | Glass cleaner resistance (Adhesion) | Water resistance (Adhesion) | Storage stability |
|---|---|---|---|---|---|---|---|
| Ex. 1 | 20 | 4 | Good | Good | Good (Good) | Good (Good) | Good |
| Ex. 2 | 20 | 12 | Good | Good | Good (Good) | Good (Good) | Good |
| Ex. 3 | 20 | 2 | Good | Good | Good (Good) | Good (Good) | Good |
| Ex. 4 | 20 | 3 | Good | Good | Good (Good) | Good (Good) | Good |
| Ex. 5 | 20 | 4 | Good | Good | Good (Good) | Good (Good) | Good |
| Ex. 6 | 20 | 5 | Good | Good | Good (Good) | Good (Good) | Good |
| Ex. 7 | 20 | 15 | Good | Good | Good (Good) | Good (Good) | Good |
| Ex. 8 | 20 | 10 | Good | Good | Good (Good) | Good (Good) | Good |
| Ex. 9 | 20 | 4 | Good | Fair | Good (Good) | Good (Good) | Good |
| Comp. Ex. 1 | 80 | 1 | Poor | Poor | Poor (Poor) | Poor (Poor) | Poor |
| Comp. Ex. 2 | 60 | 6 | Good | Fair | Poor (Poor) | Poor (Poor) | Poor |
| Comp. Ex. 3 | 60 | 2 | Good | Fair | Poor (Poor) | Poor (Poor) | Poor |
| Comp. Ex. 4 | 80 | 2 | Poor | Fair | Poor (Poor) | Poor (Poor) | Poor |
| Comp. Ex. 5 | 60 | 8 | Good | Fair | Poor (Poor) | Poor (Poor) | Poor |
| Comp. Ex. 6 | 80 | 15 | Good | Good | Poor (Poor) | Poor (Poor) | Good |
| Comp. Ex. 7 | 40 | 2 | Poor | Fair | Poor (Poor) | Poor (Poor) | Poor | groups, and in which some or all of the positions para to the phenolic hydroxyl groups include substituents;
(B) 50 to 500 parts by weight of the cationic polymerizable compound;
(C) 0.5 to 20 parts by weight of the photo- and/or thermo-cationic initiator; and
(D) 100 parts by weight of the reactive organosilicon compound represented by the formula (I) above.

3. The cationic curable composition according to claim 2, wherein the reactive organosilicon compound (D) has the formula (I) wherein n=1.

4. The cationic curable composition according to claim 1, wherein in (A), the polymerizable functional group is a vinyl ether group and/or —(R—O)$_m$H wherein R represents an alkyl group optionally having a branched chain; and m represents an integer of 1 to 10.

5. The cationic curable composition according to claim 4, wherein in (A), the polymerizable functional group is —(R—O)$_m$H wherein R represents an alkyl group optionally having a branched chain; and m represents an integer of 1 to 10.

6. The cationic curable composition according to claim 1, wherein the cationic polymerizable compound (B) is a vinyl ether compound.

7. The cationic curable composition according to claim 1, wherein the cationic polymerizable compound (B) is an epoxy compound.

8. The cationic curable composition according to claim 7, wherein the cationic polymerizable compound (B) is an alicyclic epoxy compound.

9. The cationic curable composition according to claim 1, wherein the photo- and/or thermo-cationic initiator (C) is a photocationic initiator.

10. A cured product obtained by irradiating the cationic curable composition according to claim 1 with an actinic ray.

11. A cured product obtained by irradiating the cationic curable composition according to claim 1 with an actinic ray and further heating the irradiated composition.

12. A cationic curable ink jet ink comprising the cationic curable composition according to claim 1.

13. A cured product of ink obtained by irradiating the ink according to claim 12 with an actinic ray.

14. A cured product of ink obtained by irradiating the ink according to claim 12 with an actinic ray and further heating the irradiated ink.

15. A cationic curable gravure ink comprising the cationic curable composition according to claim 1.

16. A cationic curable composition for hard coating, comprising the cationic curable composition according to claim 1.

17. A cationic cured product for hard coating, obtained by irradiating the cationic curable composition for hard coating according to claim 16 with an actinic ray.

18. A cationic cured product for hard coating, obtained by irradiating the cationic curable composition for hard coating according to claim 17 with an actinic ray and further heating the irradiated composition.

19. The cationic curable composition according to claim 1, wherein the substituent is an alkyl group, an alkoxy group, a cycloalkyl group, an aryl group, or an aralkyl group.

20. The cationic curable composition according to claim 1, comprising components (A) to (D) in the following proportion:
(A) 1 to 100 parts by weight of a phenol derivative having 3 or more aromatic rings per molecule, wherein the phenol derivative has a structure in which some or all hydrogen atoms of phenolic hydroxyl groups of the aromatic rings are substituted by cationic polymerizable functional groups, or in which all of the positions para to the phenolic hydroxyl groups include substituents;
(B) 1 to 500 parts by weight of the cationic polymerizable compound;
(C) 0.05 to 20 parts by weight of the photo- and/or thermo-cationic initiator; and
(D) 100 parts by weight of a reactive organosilicon compound represented by the formula (I):

[Formula 1]

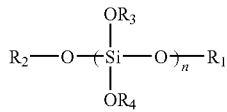
(1)

wherein n represents an integer of 1 or 2; and R$_1$ to R$_4$ each are an alkyl group having a carbon number of 1 to 4 and may be identical or different.

21. The cationic curable composition according to claim 20, comprising components (A) to (D) in the following proportion:
(A) 1 to 100 parts by weight of a phenol derivative having 3 or more aromatic rings per molecule, wherein the phenol derivative has a structure in which some or all hydrogen atoms of phenolic hydroxyl groups of the aromatic rings are substituted by cationic polymerizable functional groups, and in which all of the positions para to the phenolic hydroxyl groups include substituents;
(B) 1 to 500 parts by weight of the cationic polymerizable compound;
(C) 0.05 to 20 parts by weight of the photo- and/or thermo-cationic initiator; and
(D) 100 parts by weight of a reactive organosilicon compound represented by the formula (1):

[Formula 1]

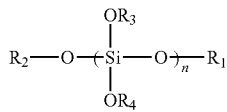
(1)

wherein n represents an integer of 1 or 2; and R$_1$ to R$_4$ each are an alkyl group having a carbon number of 1 to 4 and may be identical or different.

* * * * *